Figure 1:
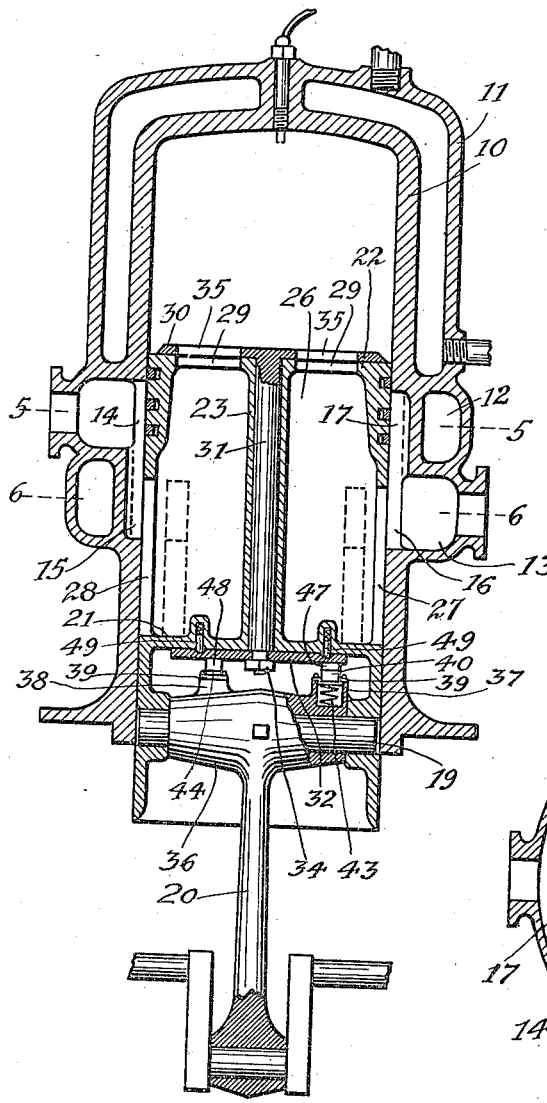

G. W. NYQUIST.
EXPLOSIVE ENGINE.
APPLICATION FILED FEB. 27, 1915.

1,236,472.

Patented Aug. 14, 1917.
2 SHEETS—SHEET 1.

Witnesses:
Theo. Lagaard.
H. A. Bowman

Inventor:
Gustaf W. Nyquist.
By his Attorney.

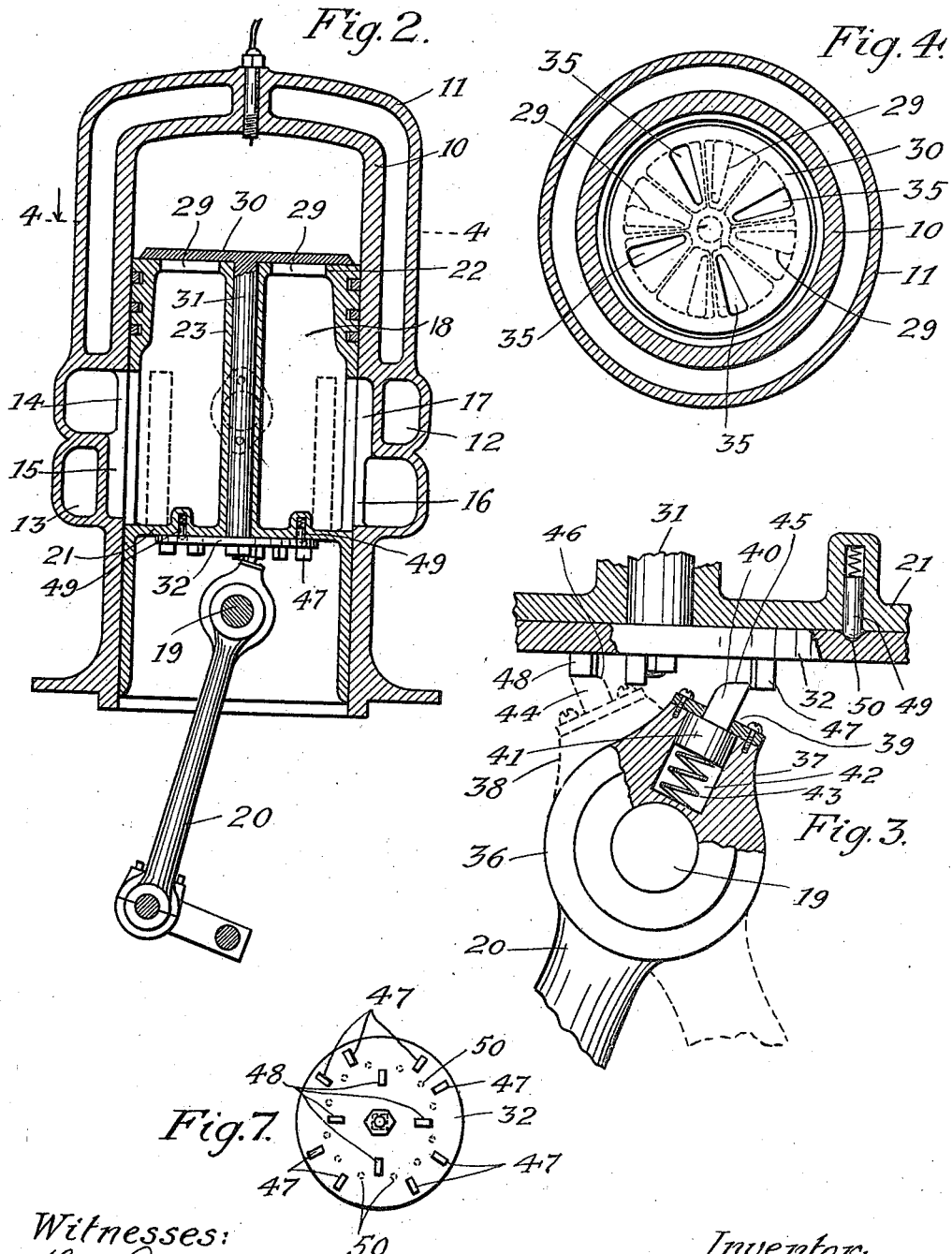

UNITED STATES PATENT OFFICE.

GUSTAF W. NYQUIST, OF MINNEAPOLIS, MINNESOTA, ASSIGNOR TO ROTARY VALVE GAS ENGINE COMPANY, OF MINNEAPOLIS, MINNESOTA, A CORPORATION.

EXPLOSIVE-ENGINE.

1,236,472.  Specification of Letters Patent.  Patented Aug. 14, 1917.

Application filed February 27, 1915.  Serial No. 10,888.

*To all whom it may concern:*

Be it known that I, GUSTAF W. NYQUIST, a citizen of the United States, residing at Minneapolis, in the county of Hennepin and State of Minnesota, have invented certain new and useful Improvements in Explosive-Engines, of which the following is a specification.

My invention relates to explosive engines and has for its object to provide an explosive engine having a chambered piston with portions thereof in communication with the exhaust and intake passageways, respectively, in combination with a valve movable with the piston and moved by oscillation of the piston rod for opening and closing in timed sequences the interior of the cylinder to the said exhaust and intake passageways.

The full objects and advantages of my invention will appear in connection with the detailed description thereof and are particularly pointed out in the claims.

In the drawings, illustrating the application of my invention in one form,—

Figure 6:
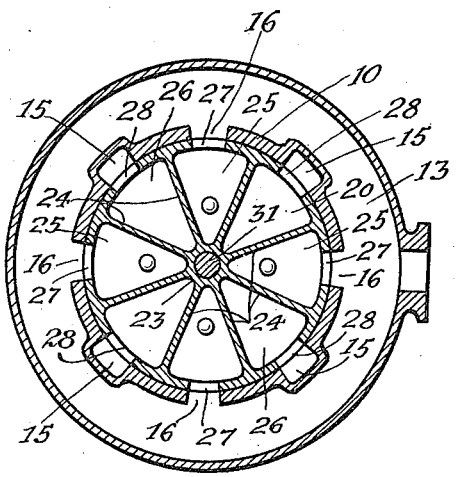
Figure 5:
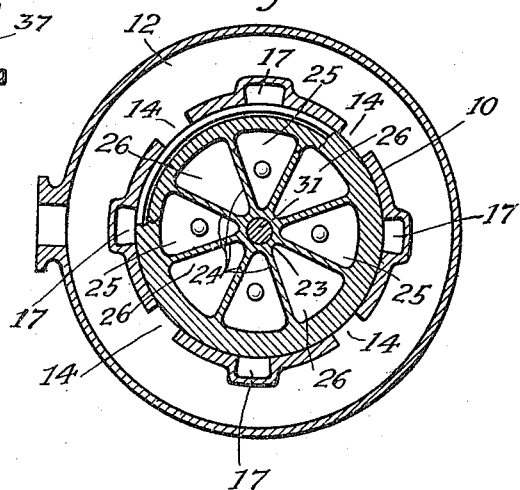

Figure 1 is a sectional view through the cylinder and piston along the length of the pin by which the connecting rod is secured to the piston. Fig. 2 is a similar view taken at right angles to the connector pin. Fig. 3 is an enlarged part sectional fragmentary view of some of the parts shown in Fig. 2. Fig. 4 is a sectional view on line 4—4 of Fig. 2. Fig. 5 is a sectional view on line 5—5 of Fig. 1. Fig. 6 is a sectional view on line 6—6 of Fig. 1. Fig. 7 is an end view of the valve-operating plate.

A cylinder 10, of usual form, having a water-jacket 11 has cast around the intermediate portion thereof an annular exhaust passageway 12, and beneath that an annular intake passageway 13. Exhaust passageway 12 opens into the interior of cylinder 10 through a series of ports (four in number, as shown) 14, which, as indicated in Figs. 1 and 2 at the left, connect with a depending channel 15 in front of passageway 13, which also opens throughout its length into the interior of cylinder 10. The annular passageway 13, as clearly indicated in Fig. 6, opens into the interior of cylinder 10 through a series of ports 16 corresponding in number and alternatively disposed in respect to ports 14; and the ports 16, in connection with upwardly-extended channels 17, which are shown at the right in Figs. 1 and 2, open throughout their length into the interior of cylinder 10. A piston 18 is connected in the usual manner by pin 19 with pitman or piston rod 20. The piston is provided with a lower partition 21 and an upper partition 22 integrally connected with the side walls of the piston and spaced from one another. A tubular stem 23 connects the two partition walls, and extending between said stem and the side walls are a series of radial partitions 24 whereby the space between the partitions is divided into two sets of separated chambers 25 and 26. There are in the form shown eight of such chambers. There are slotted openings 27 extending through the wall of the piston into chambers 25 and similar slotted openings 28 extending through the walls of the cylinder into chambers 26, as best indicated in Fig. 6. It is apparent, therefore, that the four chambers 25 are in communication through port openings 27, 16 and 17 with annular intake passageway 13. Likewise, the chambers 26 are in communication through port openings 28, 15 and 14 with annular exhaust passageways 12. Into each of the chambers 25 and 26 opens through the top partition 22 a port 29 of a shape and size clearly indicated in dotted lines in Fig. 4. A valve plate 30 rests upon the top of partition 22 and has a stem 31 extended through the tubular stem 23 and a plate 32 secured to the lower end of stem 31 by means of a nut 34 so as to engage with its inner surface the partition wall 21. The plate 32 is provided with four ports 35 symmetrically positioned thereon, each port being of the same size and shape as the chamber ports 29, as clearly indicated in Fig. 4. The distance between ports 35 is such that when the same register with any four ports 29 the other four ports 29 will be covered by the disk 30, and in one position of the disk 30 the ports 35 will be out of register with any of the ports 29, for a purpose later to be described.

Plate 32 is fast on the stem 31 and in combination with means on the connecting rod has means whereby the disk 30 is given a step-by-step rotation to open and close communication between the inlet passageways 25 and the exhaust passageways 26. As shown in Figs. 1 and 3, the hub or shank 36 of connecting rod 20 is provided with a pair of bosses 37 and 38 capped with plates 39 through which extend dogs 40 and 44 on cylindrical members 41 slidable in corresponding cavities 42 in the bosses 37 and 38, and being normally pressed outward by springs 43 seated in said cavities. The dogs 40 and 44 are on opposite sides of the axis of rotation of valve plate 30 and stem 31, and dog 44 is placed closer to said axis than dog 41. The dogs are provided with bevel faces 45 and 46, respectively, which are turned in opposite directions, since the dogs operating on opposite sides of the axis 31 must actuate the valve plate 30 when moving in opposite directions in order to move the valve plate always in the same direction. The dog 40 coöperates with a series of lugs 47 near the outside of plate 32, there being eight of such lugs. The dog 44 coöperates with four lugs 48 upon plate 32, and nearer the axial center thereof. Having reference to Fig. 7, it will be noted that the eight lugs 47 are positioned in pairs, each pair being symmetrically spaced in angular relation between pairs of lugs 48. From this arrangement, and having reference to Fig. 3, it will be seen that the dogs 40 and 44, which reciprocate through a maximum distance, are adapted to engage the lugs 47 and 48, yielding so as to pass over said lugs when moving in one direction and actuating the lug, and with it the plate 32, so as to rotate stem 31 and valve plate 30 when moving in the opposite direction. The pairs of lugs 47 are spaced sufficiently close together so that such pairs will be consecutively operated at each down stroke of the piston. The spaces between such pairs are such that it would require two down strokes to pass across such spaces and effect actuation of the valve plate through the first of a succeeding pair of lugs; but on the intervening up stroke the lug 48 is engaged by the dog 44 and the valve actuated so that each down stroke of the piston causes an actuation of the valve plate 30. Only alternate up strokes, however, cause actuation of the plate, so that each second up stroke results in compression of the charge to the point of firing, when the succeeding down stroke actuates the valve plate to permit exhaust. This is made possible because of the fact, as above pointed out, that there is a position of the valve plate 30 such that the ports 35 are not in communication with any of ports 29 into the exhaust and intake passageways.

The operation of the device, having reference to Fig. 4, and bearing in mind that the usual four-cycle action takes place, is as follows: In the position of the valve shown in Fig. 4, a down stroke has taken place, resulting in the positioning of the parts so that ports 35 register with ports 29 opening into exhaust passageways 26. At the next up stroke a reverse movement of dog 44 will move ports 35 so as to register with ports 29 opening into inlet passageways 25, whereby charging of the cylinder will take place during downward movement of the piston, which will result in shifting the valve a further step where ports 35 will be out of register with any of ports 29. During the next upward or compression stroke there will be no action, and compression and firing will take place followed by a further operation of the valve, upon the down stroke opening the exhaust and completing the cycle. Engaging the plate 32 are a series of spring-held studs 49 which seat in sockets 50 in the surface of plate 32, the sockets indicated in dotted lines in Fig. 7 corresponding in position to the several successive positions of the valve 35. By this means the valve is held fixed in several positions.

It will be apparent that my engine provides valve mechanism self-contained in the piston whereby the gases may be fed to and exhausted from the cylinder and the valve operated by the oscillation of the connector rod hub. This not only simplifies the construction, but renders it certain and correct in action.

I claim:

1. An explosive engine comprising a cylinder, a hollow piston having two sets of separate chambers, each chamber of each set opening through a separate port to the interior of the cylinder, means to supply explosive mixture to all of the chambers of one set and means to permit exhaust of gases of combustion from all of the chambers of the other set, a valve having ports adapted to coöperate in succession with the several ports from the chambers of each set to effect charging and exhaust of said cylinder in timed sequence when the valve is given a step by step movement, and means for effecting such step by step movement of the valve.

2. An explosive engine comprising a cylinder, a hollow piston having two sets of separate chambers, each chamber of each set opening through a separate port to the interior of the cylinder, means to supply explosive mixture to all of the chambers of one set and means to permit exhaust of gases of combustion from all of the chambers of the other set, a valve having ports adapted to coöperate in succession with the several ports from the chambers of each set to effect charging and exhaust of said cylinder in timed sequence when the valve is given a step by step movement, a connecting rod, and means actuated by said rod for giving the valve a step by step movement.

3. An explosive engine comprising a cylinder, a piston having separated chambers with ports opening through the ends thereof, means to supply explosive mixture to some of said chambers and to permit exhaust of gases of combustion from the other of said chambers, a valve for opening communication of said respective sets of chambers with the interior of the cylinder in properly timed sequence when said valve is given a step by step movement of equal extent for each step, but in a timed cycle wherein the time between movements of certain steps is longer than the time between movements of other steps, and means for giving the valve such a step by step movement.

4. An explosive engine comprising a cylinder, a piston having separated chambers with ports opening through the ends thereof, means to supply explosive mixture to some of said chambers and to permit exhaust of gases of combustion from the other of said chambers, a rotary valve for opening communication of said respective sets of chambers with the interior of the cylinder in properly timed sequence when said valve is given a step by step movement of equal extent for each step, but in a timed cycle wherein the time between movements of certain steps is longer than the time between movements of other steps, said valve having connected therewith a plate with two sets of lugs thereon, and a connecting rod having an extended hub with a pair of dogs engageable respectively each with a different set of said lugs whereby oscillation of said dogs by the connecting rod causes said dogs to engage such lugs alternately part of the time and part of the time successively by one of said dogs to rotate the plate and valve by uniform steps and unequally timed by said steps, as stated.

5. An explosive engine comprising a cylinder, a piston in the form of a cylinder having its interior divided into two sets of separated chambers, each chamber of each set opening from the end of said piston to the interior of the cylinder, means to supply explosive mixture to one set of said chambers and means to permit exhaust of gases of combustion from the other set of said chambers, a disk valve resting upon the top of the piston and adapted to open and close communication of said respective sets of chambers with the interior of the cylinder in timed sequence, a stem connected with said disk valve and extending to the lower side of the piston, a plate on the stem having a series of lugs, a connecting rod having a hub, and a dog on the hub coöperating with said lugs to operate the valve through oscillation of said hub.

6. An explosive engine comprising a cylinder, a piston having sets of separated chambers each chamber of each set opening from the end of the piston into the interior of the cylinder, means to supply explosive mixture to one of said sets of chambers and to permit exhaust of gases of combustion from the other of said sets of chambers, a disk valve resting upon the top of the piston and adapted to open and close communication of said respective sets of chambers with the interior of the cylinder in timed sequence, a stem connected with said disk valve and extending to the lower side of the piston, a plate on the stem having a series of lugs, a connecting rod having a hub, and a dog on the hub coöperating with said lugs to operate the valve through oscillation of said hub.

7. An explosive engine comprising a cylinder, a piston having sets of separated chambers each chamber of each set opening from the end of the piston into the interior of the cylinder, means to supply explosive mixture to one of said sets of chambers and to permit exhaust of gases of combustion from the other of said sets of chambers, a disk valve resting upon the top of the piston and adapted to open and close communication of said respective sets of chambers with the interior of the cylinder in timed sequence, a stem connected with said disk valve and extending to the lower side of the piston, a plate on the stem having a series of lugs, a connecting rod having a hub, and spring-actuated dogs on the hub coöperating with said lugs to operate the valve through oscillation of said hub.

8. An explosive engine comprising a cylinder, a piston having sets of separated chambers each chamber of each set opening from the end of the piston into the interior of the cylinder, means to supply explosive mixture to one of said sets of chambers and to permit exhaust of gases of combustion from the other of said sets of chambers, a disk valve resting upon the top of the piston and adapted to open and close communication of said respective sets of chambers with the interior of the cylinder in timed sequence, a stem connected with said disk valve and extending to the lower side of the piston, a plate on the stem having two sets of lugs, a connecting rod having a hub, and a pair of dogs on the hub on opposite sides of the axis of the stem each dog coöperating with one set of said lugs to operate the valve through oscillation of said hub.

9. An explosive engine comprising a cylinder, a piston having sets of separated chambers each chamber of each set opening from the end of the piston into the interior of the cylinder, means to supply explosive mixture to one of said sets of chambers and to permit exhaust of gases of combustion from the other of said sets of chambers, a disk valve resting upon the top of the piston and adapted to open and close communication of said respective sets of chambers with the interior of the cylinder in timed sequence, a stem connected with said disk valve and extending to the lower side of the piston, a plate on the stem having two sets of lugs, a connecting rod having a hub, and a pair of dogs on the hub on opposite sides of the axis of the stem each dog coöperating with one set of said lugs to operate the valve through oscillation of said hub, said dogs both acting to turn the valve always in the same direction.

10. An explosive engine, comprising a cylinder, a piston in the form of a cylinder having its interior divided into a multiplicity of radially arranged chambers said chambers being divided into two sets the members of each set alternating with those of the other set, means to supply explosive mixture to one set of said chambers and to permit the exhaust of gases of combustion from the other set of said chambers, a valve for opening communication of said respective sets of chambers from the interior of the chamber in timed sequence, and means for operating the valve.

11. An explosive engine comprising a cylinder having an annular exhaust passageway and an annular inlet passageway, a piston in the form of a cylinder having its interior divided into a multiplicity of radially arranged chambers said chambers being divided into two sets the members of each set alternating with those of the other set and the members of one set being in communication with the exhaust passageway and the members of the other set being in communication with the inlet passageway, each of said chambers being provided with an opening through the inner end of the piston to the interior of the cylinder, a disk valve upon the end of the piston and movable therewith for opening and closing the respective sets of openings in timed sequence, and means to operate the valve.

12. An explosive engine comprising a cylinder, a piston in the form of a cylinder having its interior divided into a multiplicity of radially arranged chambers said chambers being divided into two sets the members of each set alternating with those of the other set, and each of said chambers opening through the end of the piston to the interior of the cylinder, means to supply explosive mixture to one set of said chambers and to permit the exhaust of gases of combustion from the other set of said chambers, a disk valve resting upon the top of the piston and over said openings and having therein a series of openings such that operation of the valve will open and close communication of said respective sets of chambers with the interior of the cylinder in timed sequence, a stem connected with said disk valve and extending to the lower side of the piston, a plate on the stem having two sets of lugs, a connecting rod having a hub, and a pair of dogs on the hub on opposite sides of the axis of the stem each dog coöperating with one set of said lugs to operate the valve through oscillation of said hub, said dogs both acting to turn the valve always in the same direction.

13. An explosive engine comprising a cylinder, a piston having sets of separated chambers each set opening from the end of the piston into the interior of the cylinder, means to supply explosive mixture to one of said sets of chambers and to permit exhaust of gases of combustion from the other of said sets of chambers, a disk valve resting upon the top of the piston and adapted to open and close communication of said respective sets of chambers with the interior of the cylinder in timed sequence, a stem connected with said disk valve and extending to the lower side of the piston, a plate on the stem having two sets of lugs, a connecting rod having a hub, and a pair of dogs on the hub on opposite sides of the axis of the stem each dog coöperating with one set of said lugs to operate the valve through oscillation of said hub, the number of lugs in each set and their relative position on the disk being such that each down stroke of the piston causes operation of the valve through engagement of one dog with its set of lugs, while each alternate up stroke of the piston operates the valve through engagement of the other dog with its set of lugs, the inoperative up stroke permitting compression of explosive mixture in the cylinder.

In testimony whereof I affix my signature in presence of two witnesses.

GUSTAF W. NYQUIST.

Witnesses:
F. A. WHITELEY,
H. A. BOWMAN.

Copies of this patent may be obtained for five cents each, by addressing the "Commissioner of Patents, Washington, D. C."